(12) United States Patent
Workman et al.

(10) Patent No.: US 8,719,725 B2
(45) Date of Patent: May 6, 2014

(54) TOUCH OPTIMIZED PIVOT TABLE

(75) Inventors: Dan Workman, Acton, MA (US);
Andrew Watanabe, Berkeley, CA (US);
Samar Lotia, Cupertino, CA (US);
Guohong Dong, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 87 days.

(21) Appl. No.: 13/185,286

(22) Filed: Jul. 18, 2011

(65) Prior Publication Data

US 2013/0024803 A1  Jan. 24, 2013

(51) Int. Cl.
*G06F 3/048* (2013.01)

(52) U.S. Cl.
USPC ........... 715/781; 715/212; 715/227; 715/764; 715/853; 715/864

(58) Field of Classification Search
USPC ................. 715/781, 212–214, 227, 243, 780, 715/782–788, 764, 792, 853, 854, 864
See application file for complete search history.

(56) References Cited

U.S. PATENT DOCUMENTS

| | | | |
|---|---|---|---|
| 5,917,492 A * | 6/1999 | Bereiter et al. | 715/854 |
| 6,002,865 A * | 12/1999 | Thomsen | 1/1 |
| 6,430,574 B1 * | 8/2002 | Stead | 1/1 |
| 7,864,163 B2 * | 1/2011 | Ording et al. | 345/173 |
| 2006/0036955 A1 * | 2/2006 | Baudisch et al. | 715/747 |
| 2006/0242164 A1 * | 10/2006 | Evans et al. | 707/100 |
| 2008/0165149 A1 * | 7/2008 | Platzer et al. | 345/173 |
| 2008/0172408 A1 * | 7/2008 | Meliksetian et al. | 707/102 |
| 2009/0187815 A1 * | 7/2009 | Becerra et al. | 715/212 |
| 2010/0088641 A1 * | 4/2010 | Choi | 715/828 |
| 2011/0099513 A1 * | 4/2011 | Ameline | 715/790 |
| 2011/0296341 A1 * | 12/2011 | Koppert | 715/786 |
| 2012/0254790 A1 * | 10/2012 | Colombino et al. | 715/781 |

\* cited by examiner

*Primary Examiner* — Kieu Vu
*Assistant Examiner* — Shangao Zhang
(74) *Attorney, Agent, or Firm* — Kilpatrick Townsend & Stockton LLP

(57) ABSTRACT

Embodiments of the invention include a method of implementing a touch screen optimized pivot table. The method includes providing a view of a hierarchal table on a touch screen. The hierarchal table includes hierarchal levels and each of hierarchal levels includes corresponding data. The method further includes mapping each of the hierarchal levels to each of a corresponding region on the touch screen. Each region's view displays the corresponding data for the mapped hierarchal level. The method further includes displaying on the touch screen the corresponding data for each of the hierarchal levels in each of the mapped regions, receiving at the touch screen input to manipulate at least one of the regions on the touch screen, and in response to the received input, causing each subordinate region to the at least one manipulated region to update the corresponding data displayed in each of the subordinate regions.

17 Claims, 10 Drawing Sheets

| | | 2002 | | | 200 |
|---|---|---|---|---|---|
| | Qtr 1 | Qtr 2 | Qtr 3 | Qtr 4 | Qtr 1 |
| Canada | | | | | |
| Alberta | 2,500 | 2,500 | 2,500 | 2,500 | 2,50 |
| Ontario | 2,500 | 2,500 | 2,500 | 2,500 | 2,50 |
| Quebec | 1,250 | 1,250 | 1,250 | 1,250 | 1,25 |
| Alabama | 1,250 | 1,250 | 1,250 | 1,250 | 1,25 |
| Arkansas | 1,250 | 1,250 | 1,250 | 1,250 | 1,25 |
| California | 1,250 | 1,250 | 1,250 | 1,250 | 1,25 |
| Colorado | 1,250 | 1,250 | 1,250 | 1,250 | 1,25 |
| Georgia | 1,250 | 1,250 | 1,250 | 1,250 | 1,25 |
| USA | | | | | |

125 Rows, 50 Columns

TOUCH OPTIMIZED PIVOT TABLE

BACKGROUND

The present disclosure relates to touch optimized hierarchal tables and pivot tables.

Presently, navigating large tables (and even small tables to a certain degree) and pivot tables on touch screen devices (i.e., phone, tablet computing device, etc.) is tedious, in part, because of the small form factor and requirements for large row/cell size to enable touch based interactions. This situation typically has been dealt with by creating larger versions of standard tables. Furthermore, mechanisms exist that enable selection in tables with small text (e.g., microstrategy), which allows for denser data display, but nonetheless does nothing to improve navigation.

Furthermore, traditional tables/pivot tables require users to scroll through a significant amount of data to arrive at the data of interest. For example, suppose a table includes Sales Reps organized by state, with 10 Sales Reps per state. To get to sales reps for Wyoming, a user would have to scroll through 490 rows with a traditional table.

Turning now to FIG. 1A, a table 105 being partially displayed on a touch screen device 110, is illustrated. In table 105 all of the levels of the hierarchy are fully expanded and so scrolling through the table to find specific data is extremely difficult. Furthermore, since the table headers are not persistent in all views, it becomes easy for a user to become lost or disoriented within the table. As such, if each level includes 1000 lines, and 10 lines are displayed on touch screen device 110 at a time, then about 100 scrolls would be needed to reach the end of table 105.

Referring to FIG. 1B, a view of touch screen device 110 with fixed headers 115 and 120 and scroll bars 125 and 130 is illustrated. This improves the view in FIG. 1A, but still has a number of shortcomings. With the fixed headers 115 and 120, the display area is significantly limited and much of the data in the table is unable to be displayed. Further, using scroll bars 125 and 130, there is a significant amount of scrolling and panning required to navigate through the table. Furthermore, an additional problem exists in such tables without scroll bars in that the table is scrolled as a whole, rather than by layers, so that an extremely high amount of scrolling is necessary to navigate an entire hierarchical table. Hence, improvements in the art are needed.

BRIEF SUMMARY

One embodiment of the invention includes a method of implementing a touch screen optimized pivot table. The method includes providing a view of a hierarchal table on a touch screen. The hierarchal table includes hierarchal levels and each of the hierarchal levels includes corresponding data. The method further includes mapping each of the hierarchal levels to each of a corresponding region on the touch screen. Each region's view displays the corresponding data for the mapped hierarchal level. The method further includes displaying on the touch screen the corresponding data for each of the hierarchal levels in each of the mapped regions, receiving at the touch screen input to manipulate at least one of the regions on the touch screen, and in response to the received input, causing each subordinate region to the at least one manipulated region to update the corresponding data displayed in each of the subordinate regions.

The method further includes in response to receiving the input to manipulate the at least one of the regions on the touch screen, causing the at least one of the regions to spin through the corresponding data in the direction of the manipulation. Further, each of the hierarchal levels has a one-to-one mapping to each of the corresponding regions on the touch screen. Also, the touch screen includes a multi-touch screen, and more than one of the regions are configured to be manipulated independently, but there may be dependencies in nested columns (e.g., spinning states updates cities.).

The method further includes orienting the regions to maximize space for making the font size large enough to be easily readable for each region and maximize the number of levels of the hierarchy simultaneously displayed on the touch screen.

In a further embodiment, a machine-readable storage medium having sets of instructions stored thereon is described. The machine-readable storage medium includes instructions for providing a view of a hierarchal table on a touch screen. The hierarchal table includes hierarchal levels and each of hierarchal levels includes corresponding data. The machine-readable storage medium further includes instructions for mapping each of the hierarchal levels to each of a corresponding region on the touch screen. Each region's view displays the corresponding data for the mapped hierarchal level. The machine-readable storage medium further includes instructions for displaying on the touch screen the corresponding data for each of the hierarchal levels in each of the mapped regions, receiving at the touch screen input to manipulate at least one of the regions on the touch screen, and in response to the received input, causing each subordinate region to the at least one manipulated region to update the corresponding data displayed in each of the subordinate regions.

In yet another embodiment, a device is described. The device includes a multi-touch screen, a memory, and a processor coupled with the memory and the multi-touch screen. The memory includes sets of instructions stored thereon which, when executed by the processor, cause the processor to provide a view of a hierarchal table on the multi-touch screen. The hierarchal table includes hierarchal levels and each of the hierarchal levels includes corresponding data. The processor further maps each of the hierarchal levels to each of a corresponding region on the multi-touch screen. Each region's view displays the corresponding data for the mapped hierarchal level. Further, the processor displays on the multi-touch screen the corresponding data for each of the hierarchal levels in each of the mapped regions, receives input at the multi-touch screen to manipulate at least one of the regions on the touch screen, and in response to the received input, causes each subordinate region to the at least one manipulated region to update the corresponding data displayed in each of the subordinate regions on the multi-touch screen.

BRIEF DESCRIPTION OF THE DRAWINGS

Figure 1A:
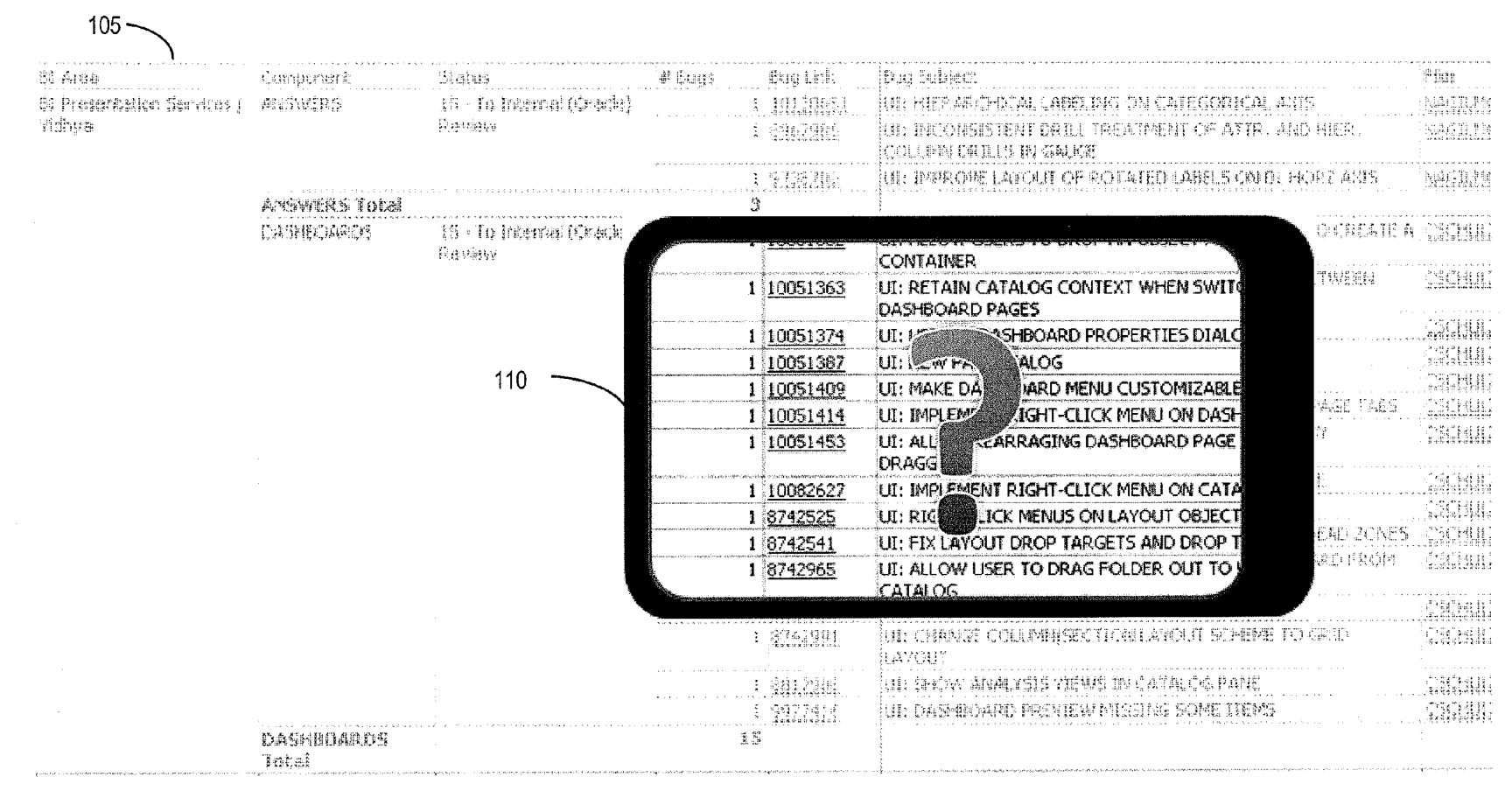

FIGS. 1A and 1B are graphical representations tables being displayed on a touch screen device.

DETAILED DESCRIPTION

In the following description, for the purposes of explanation, numerous details are set forth in order to provide an understanding of various embodiments of the present invention. It will be apparent, however, to one skilled in the art that certain embodiments can be practiced without some of these details.

Aspects of the present invention include allowing for the independent scrolling of columns and rows within a table/pivot table which provides for more efficient navigation of large tables/pivot tables within a small display area. In the previous example of the table that includes Sales Reps organized by state, the present invention would allow the user to only have to "spin" through 49 states (or 1, by spinning backwards), as opposed to 490 rows.

Further aspects of the invention include tiling a hierarchal table into a nested tiling hierarchy by transforming the data sets into multiple tiles. A display screen is then partitioned into tile locations and the data outside the viewing area of the display screen is cached for quick access once the tile is scrolled. As such, as one tile is spun the other tiles are updated according to the hierarchical structure.

Figure 2A:
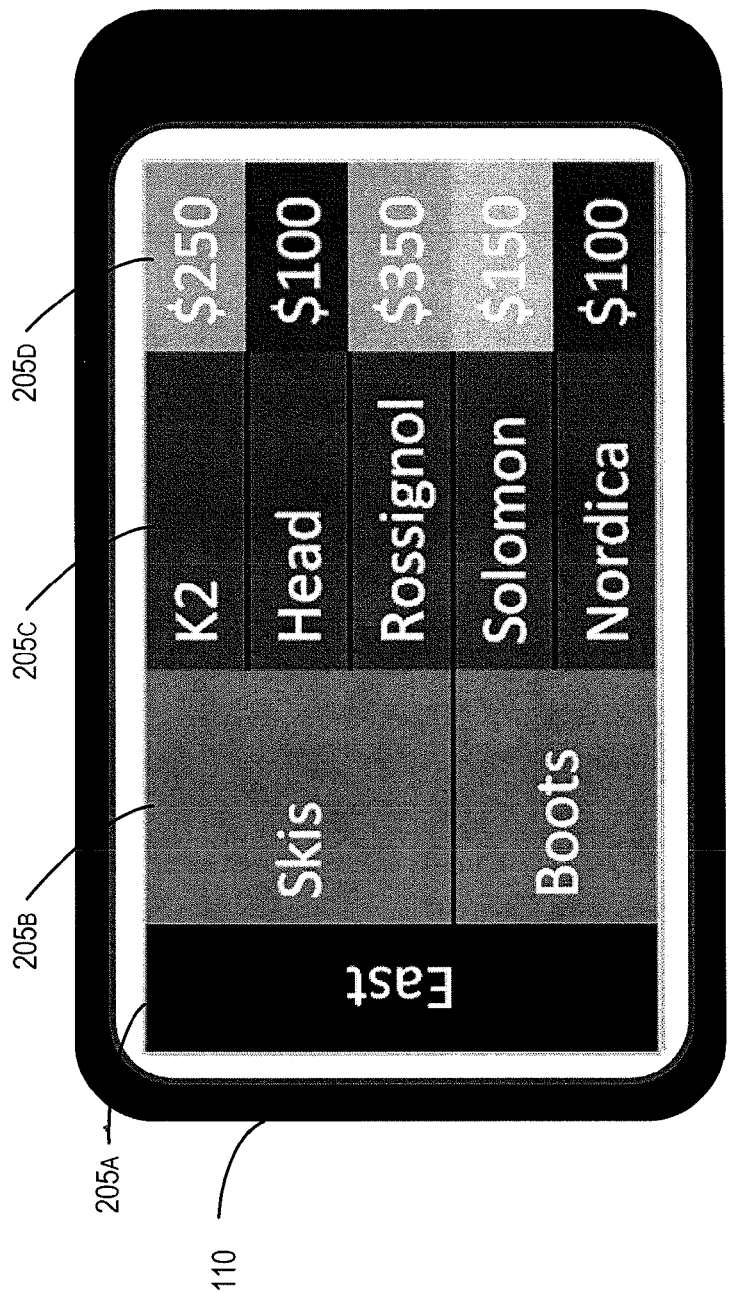
FIGS. 2A and 2B are graphical representations of touch optimized pivot tables being displayed on a touch screen device, according to embodiments of the present invention.

Turning now to FIG. 2A, a graphical representations of touch optimized pivot tables being displayed on a touch screen device 110 is illustrated, according to embodiments of the present invention. The display of touch screen device 110 in FIG. 2A includes regions 205A, 205B, 205C, and 205D. Additional or fewer regions may be present. Further, each of the regions 205A-205D represent a level of a hierarchy. As such, in this example the region 205A corresponds to the highest level of the hierarchy, which in this table happens to be location (i.e., east, west, south, etc.).

Accordingly, further down the hierarchy is region 205B which represents a product type and then region 205C which represents specific products, and lastly region 205D which represents price data. Each of the subordinate levels of the hierarchy (or regions on the display) are tied to the preceding levels. For example, if region 205A was moved from 'east' to 'west', then each of the information in regions 205B, 205C, and 205D would update in accordance with that change. For example, if the 'west' location did not include skis, but instead included gloves and boots, the region 205B would update to display boots and gloves. Accordingly, any brand and price changes would also be updated accordingly.

Furthermore, if region 205C was scrolled, then only region 205D would update as regions 205A and 205B are not subordinate in the table hierarchy to region 205C. Therefore, as the regions are manipulated, the structure of the hierarchy is maintained according to the hierarchal data structure of the table.

Figure 2B:
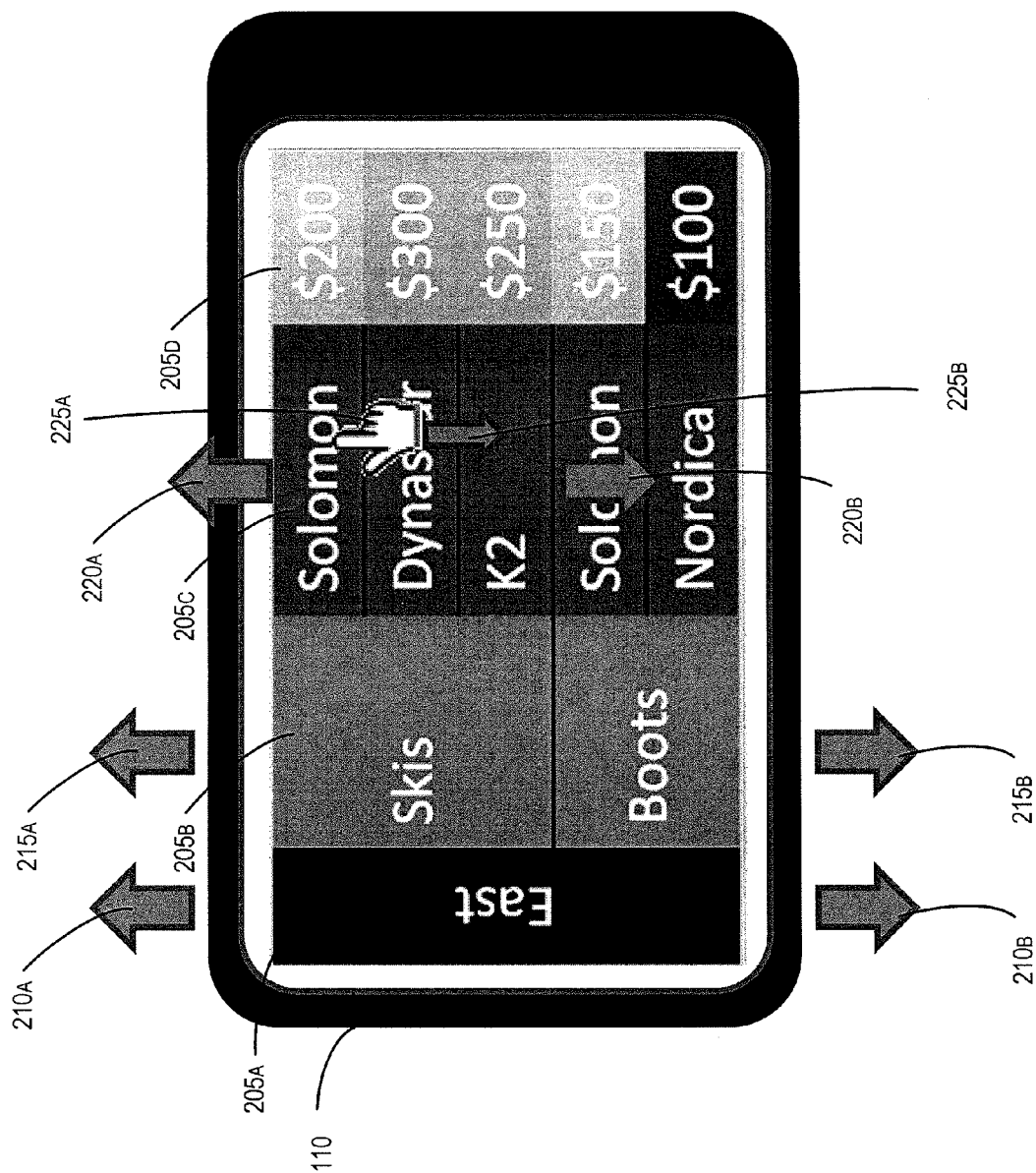

Additionally, each of the regions 205 can be independently moved in either the up or down direction as shown in FIG. 2B. At direction indicator 210A region 205A is moved up, and at direction indicator 210B region 205A is moved down. The same movement occurs for regions 205B and 205C, at direction indicators 215A, 215B, 220A, and 220B, as manipulated at point 225A in direction 225B, and so forth, as well as scrolling in the horizontal direction.

Figure 3A:
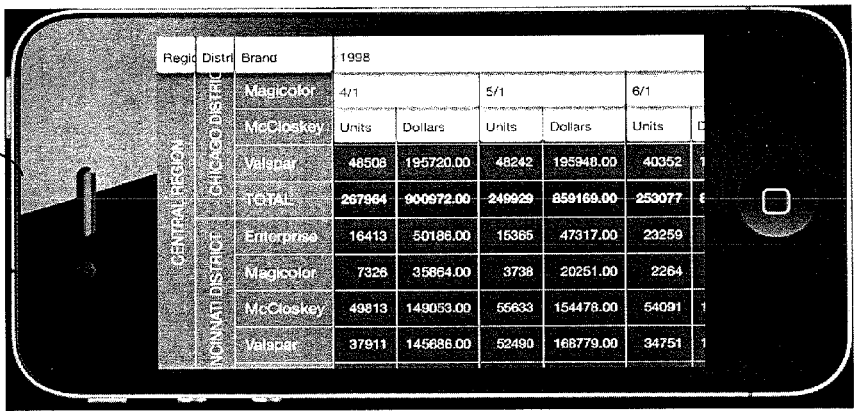
FIGS. 3A, 3B, and 3C are graphical representations of touch optimized pivot tables being displayed on a touch screen device, according to further embodiments of the present invention.
Figure 3B:
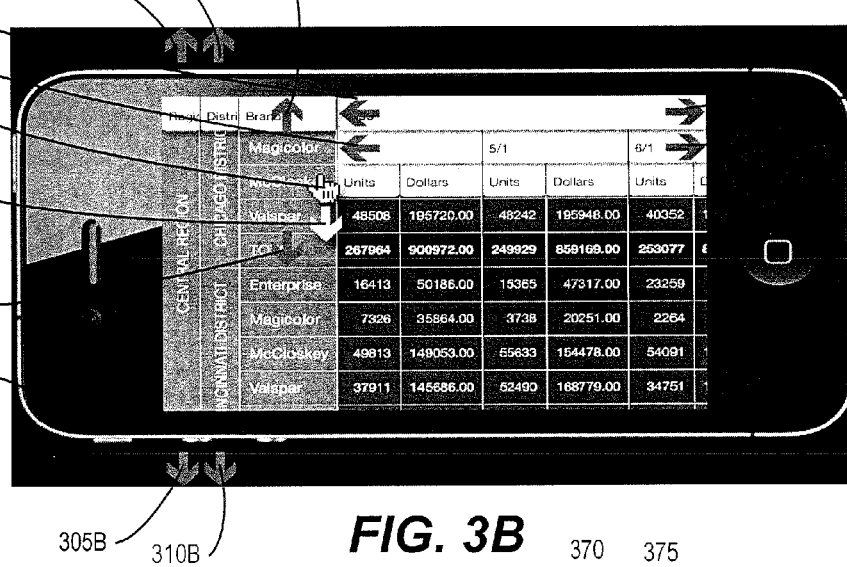
Figure 3C:
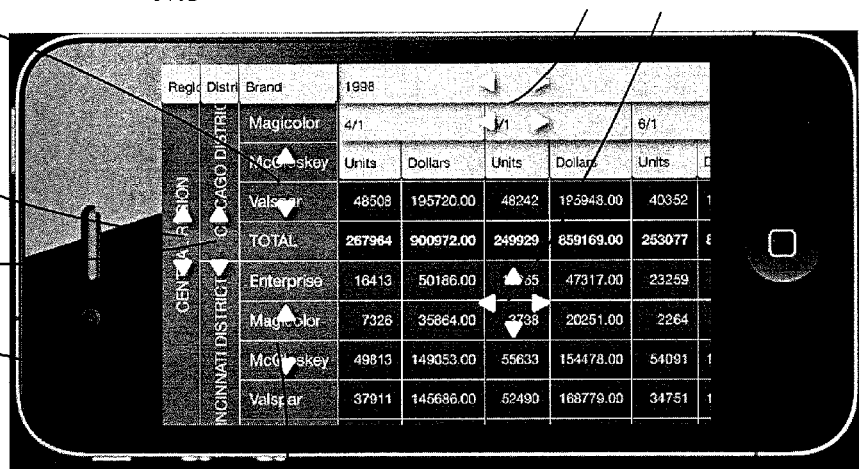

Turning now to FIGS. 3A, 3B, and 3C which illustrate a further embodiment a graphical representations of touch optimized pivot tables being displayed on a touch screen device 110. In one embodiment, as shown in FIG. 3C, spin hints 350, 355, 360, 365, 370, and 375 may be included to show a user the direction in which a region may be spun. As is shown in FIG. 3B, movements which correspond to the spin hints will cause the various regions of the table to move in the direction indicated (i.e., direction pairs 305A/305B, 310A/310B, 315A/315B, 325A/325B, and 330A/330B) when manipulated at point 320A, for example in direction 320B. Also, the data within the table may be cached to provide for quick refresh when the regions are spun in either direction to a location not currently displayed within the table. Further, headers may be expanded or collapsed using tap, double-tap, and drag functionality.

Furthermore, in this embodiment the number of children displayed per item may be limited such that the user is able to have a better sense of overall structure of the hieratical table. Further, additional children may be accessed by spinning through the children within the table structure (the spin hints 350, 355, 360, 365, 370, and 375 helping to direct the user). Alternately, any configuration of spin hints may be used and an alternative placement of such hints may be used.

Figure 4A:
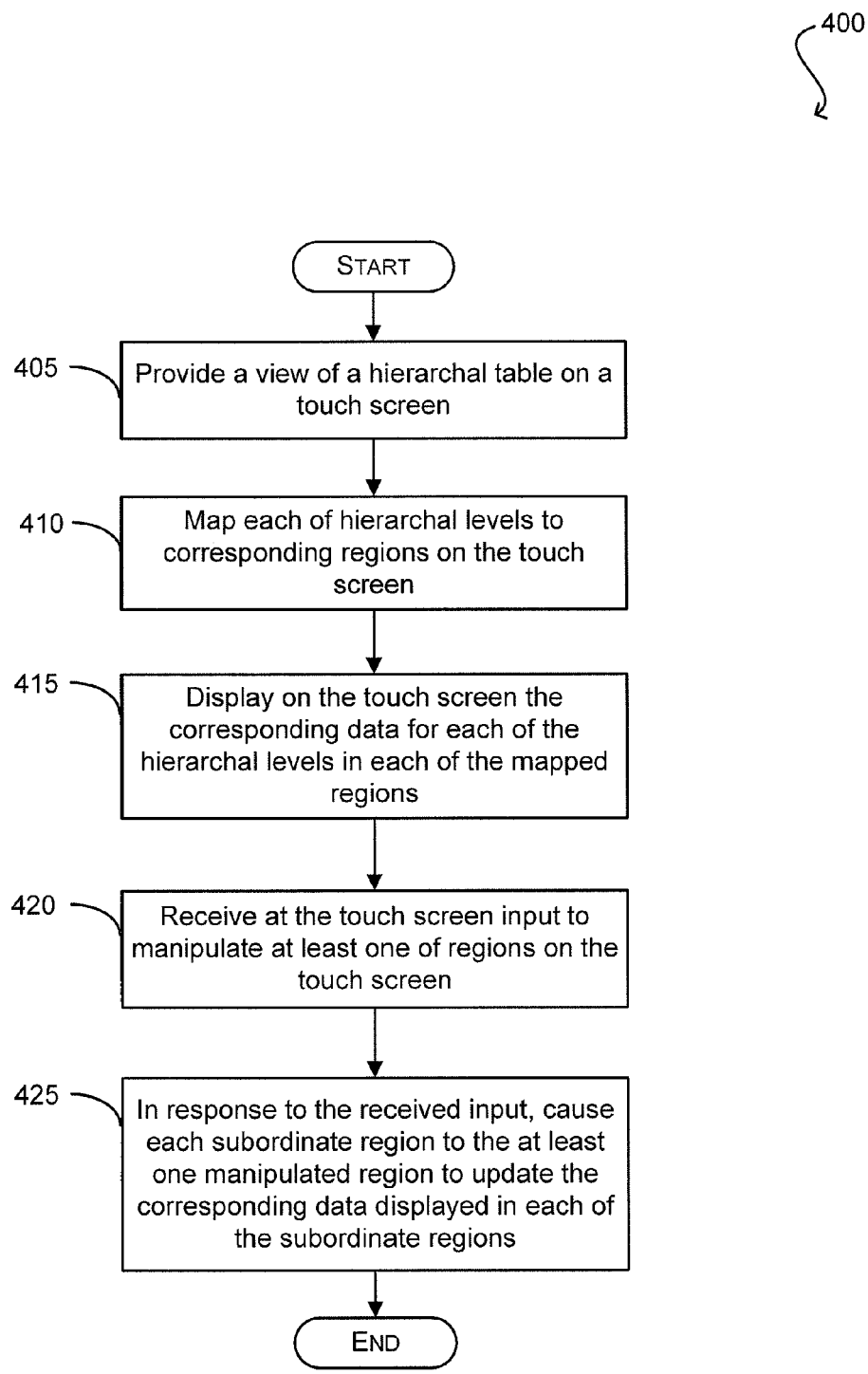
FIGS. 4A and 4B are flow diagrams of a process of implementing touch optimized pivot tables on a touch screen device, according to embodiments of the present invention.

Referring now to FIG. 4A, a method 400 of implementing touch optimized pivot tables on a touch screen device is illustrated, according to embodiments of the present invention. At process block 405, a view of a hierarchal table on a touch screen is provided. Each of the hierarchal levels are mapped to corresponding regions on the touch screen (process block 410). In one embodiment, each region's view displays the corresponding data for the mapped hierarchal level.

At process block 415, the corresponding data for each of the hierarchal levels in each of the mapped regions is displayed on the touch screen. At process block 420, input to manipulate at least one of the regions on the touch screen is received at the touch screen. The input may be via any input device, a human finger, a mouse, a stylus or the like.

Accordingly, at process block 425, in response to the received input, each subordinate region to the at least one manipulated region causes the update of the corresponding data displayed in each of the subordinate regions. As such, as any of the regions are manipulated, any of the subordinate regions in accordance with the table hierarchy are also updated.

Figure 4B:
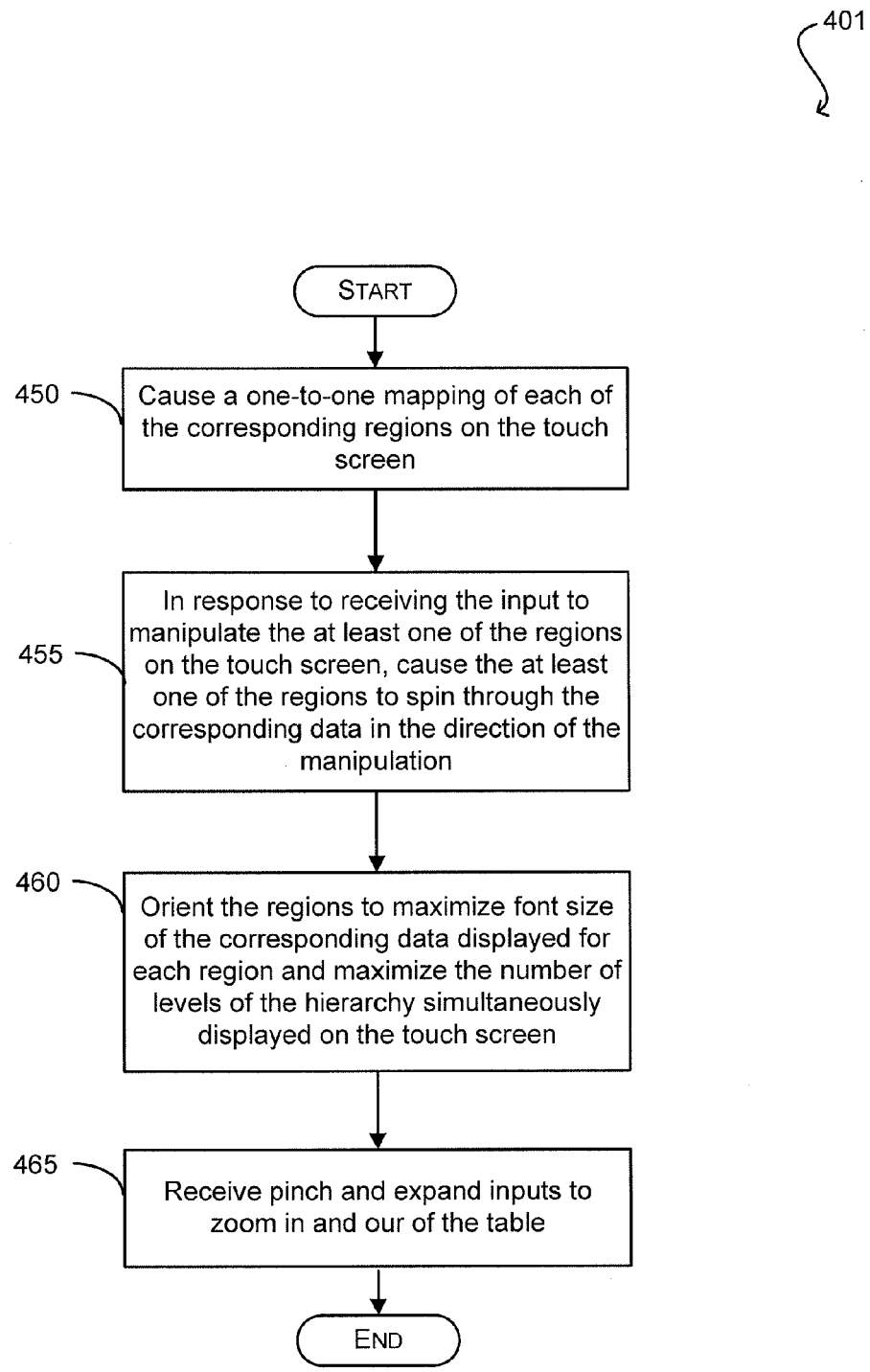

Referring next to FIG. 4B, a method 401 of implementing touch optimized pivot tables on a touch screen device is illustrated, according to a further embodiment of the present invention. At process block 450, a one-to-one mapping of each of the corresponding regions on the touch screen is provided. Therefore, each of the hierarchal levels are effectively represented by a distinct region on the touch screen display.

At process block 455, in response to receiving the input to manipulate at least one of the regions on the touch screen, the at least one of the regions spins through the corresponding data in the direction of the manipulation (i.e., up, down, left, right, etc.). Furthermore, at process block 460, the regions are positioned to maximize space for making the font size large enough to be easily readable for each region and maximize the number of levels of the hierarchy simultaneously displayed on the touch screen. At process block 465, pinch and expand functionality may also be used to zoom in and out of the view on the touch screen display.

Figure 5:
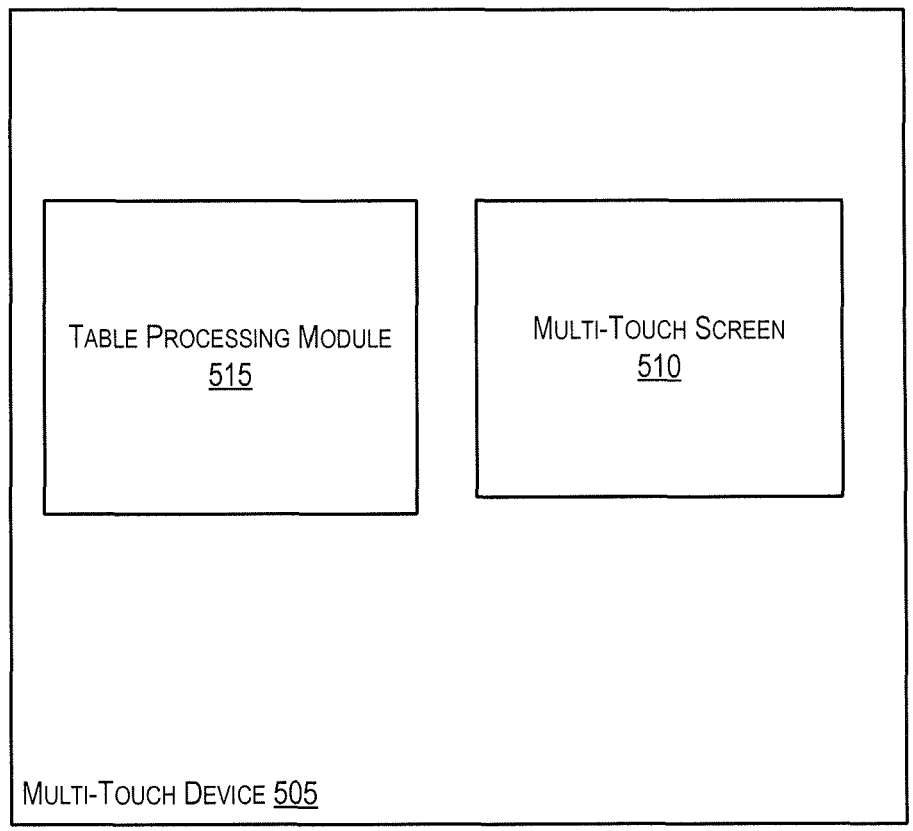
FIG. 5 is a block diagram illustrating a device for implementing and manipulating touch optimized pivot tables, according to embodiments of the present invention.

Turning now to FIG. 5, a device for implementing and manipulating touch optimized pivot tables is illustrated, according to embodiments of the present invention. In one embodiment, device 505 may include a multi-touch screen 510 and a table processing module 515. In one embodiment, the multi-touch screen 510 may be used to display and manipulate the touch optimized pivot tables, as described above. Furthermore, the table processing module 515 may be configured to implement all or part of method 500 and 501 as described in FIGS. 5A and 5B.

Figure 6:
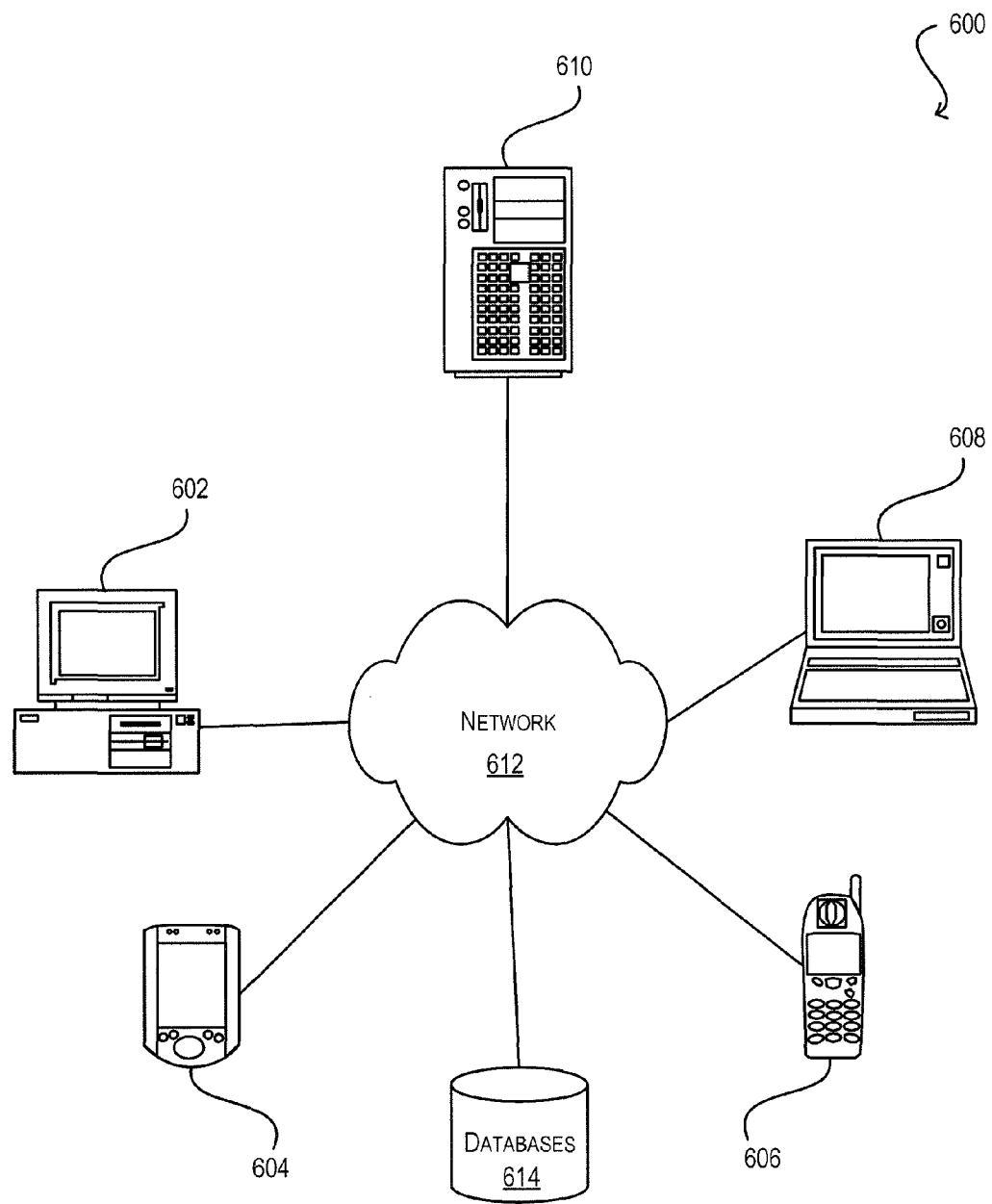
FIG. 6 is a simplified block diagram of a system environment that may be used in accordance with an embodiment of the present invention.

FIG. 6 is a simplified block diagram illustrating a system environment 600 that may be used in accordance with an embodiment of the present invention. As shown, system environment 600 includes one or more client computing devices 602, 604, 606, 608 communicatively coupled with a server computer 610 via a network 612. In one embodiment, the network 612 is a wired, wireless, mobile, cellular, etc. network. Although system environment 600 is shown with four client computing devices and one server computer, any number of client computing devices and server computers may be supported.

Client computing devices 602, 604, 606, 608 may be general purpose personal computers (including, for example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, iOS, Android, and/or other communication protocol enabled), and/or workstation computers running any of a variety of commercially-available UNIX or UNIX-like operating systems (including without limitation the variety of GNU/Linux operating systems). Alternatively, client computing devices 602, 604, 606, 608 may be any other electronic device capable of communicating over a network (e.g., network 612 described below) with server computer 610.

Server computer 610 may be a general purpose computer, specialized server computer (including, e.g., a LINUX server, UNIX server, mid-range server, mainframe computer, rack-mounted server, etc.), server farm, server cluster, or any other appropriate arrangement and/or combination. Server computer 610 may run an operating system including any of those discussed above, as well as any commercially available server operating system. Server computer 610 may also run any of a variety of server applications and/or mid-tier applications, including web servers, Java virtual machines, application servers, database servers, and the like.

As shown, client computing devices 602, 604, 606, 608 and server computer 610 are communicatively coupled via network 612. Network 612 may be any type of network that can support data communications using any of a variety of commercially-available protocols, including without limitation TCP/IP, SNA, IPX, AppleTalk, and the like. Merely by way of example, network 612 may be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 600 may also include one or more databases 614. Database 614 may reside in a variety of locations. By way of example, database 614 may reside on a storage medium local to (and/or resident in) one or more of the computers 602, 604, 606, 608, 610. Alternatively, database 614 may be remote from any or all of the computers 602, 604, 606, 608, 610 and/or in communication (e.g., via network 612) with one or more of these. In one set of embodiments, database 614 may reside in a storage-area network (SAN) familiar to those skilled in the art. Similarly, any necessary files for performing the functions attributed to the computers 602, 604, 606, 608, 610 may be stored locally on the respective computer and/or remotely on database 614, as appropriate. In one set of embodiments, database 614 is a relational database, such as Oracle 10g available from Oracle Corporation. In a particular embodiment, database 614 is adapted to store, update, and retrieve data streams in response to CQL-formatted commands received at server computer 610.

Figure 7:
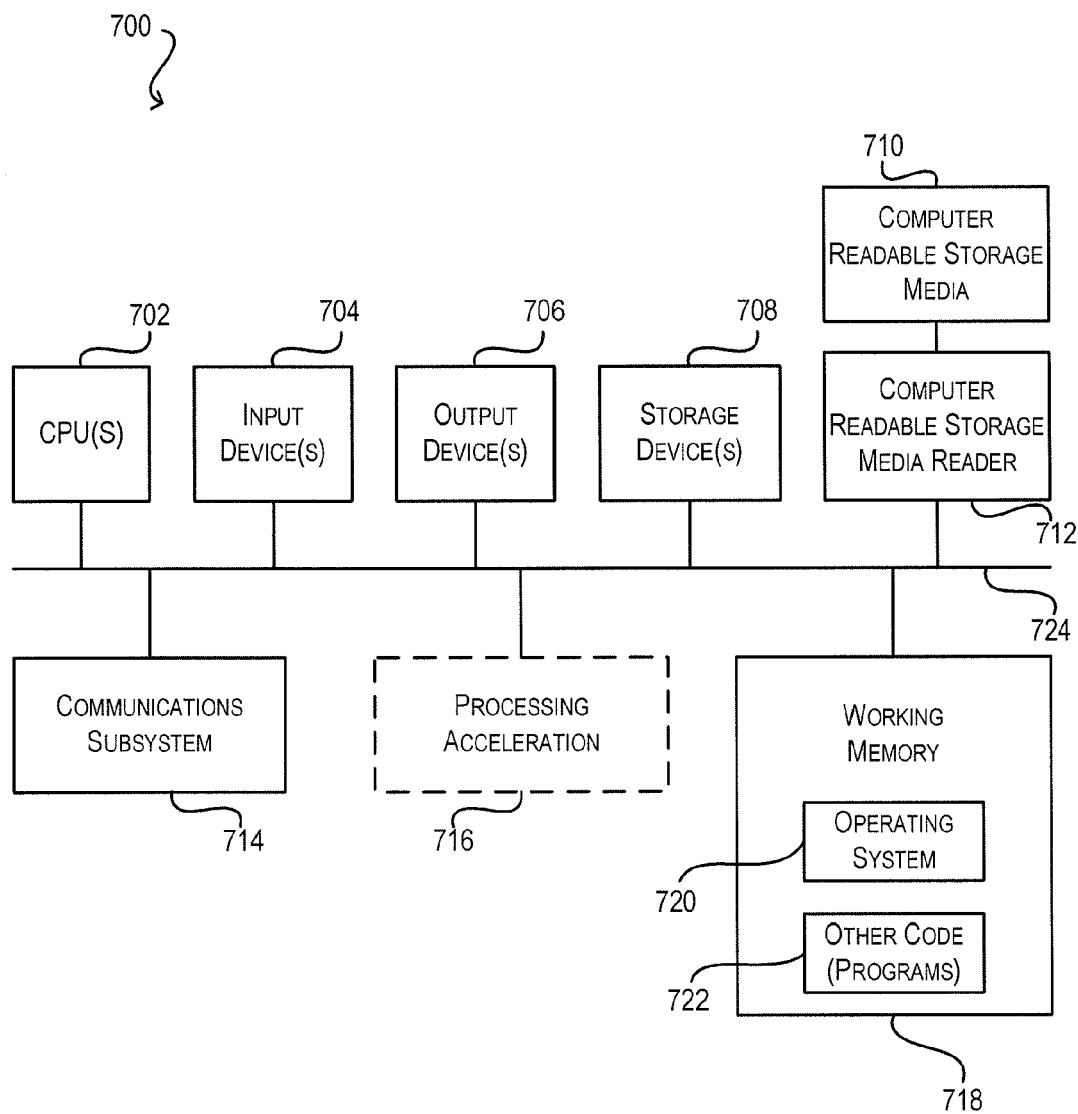
FIG. 7 is a simplified block diagram of a computer system that may be used in accordance with an embodiment of the present invention.

FIG. 7 is a simplified block diagram illustrating physical components of a computer system 700 that may incorporate an embodiment of the present invention. In various embodiments, computer system 700 may be used to implement any of the computers 602, 604, 606, 608, 610 illustrated in system environment 500 described above. As shown in FIG. 7, computer system 700 comprises hardware elements that may be electrically coupled via a bus 724. The hardware elements may include one or more central processing units (CPUs) 702, one or more input devices 704 (e.g., a mouse, a keyboard, etc.), and one or more output devices 706 (e.g., a display device, a printer, etc.). Computer system 700 may also include one or more storage devices 708. By way of example, storage device(s) 708 may include devices such as disk drives, optical storage devices, and solid-state storage devices such as a random access memory (RAM) and/or a read-only memory (ROM), which can be programmable, flash-updateable and/or the like.

Computer system 700 may additionally include a computer-readable storage media reader 712, a communications subsystem 714 (e.g., a modem, a network card (wireless or wired), an infra-red communication device, etc.), and working memory 718, which may include RAM and ROM devices as described above. In some embodiments, computer system 700 may also include a processing acceleration unit 716, which can include a digital signal processor (DSP), a special-purpose processor, and/or the like.

Computer-readable storage media reader 712 can further be connected to a computer-readable storage media 710, together (and, optionally, in combination with storage device (s) 708) comprehensively representing remote, local, fixed, and/or removable storage devices plus storage media for temporarily and/or more permanently containing computer-readable information. Communications subsystem 714 may permit data to be exchanged with network 512 of FIG. 5 and/or any other computer described above with respect to system environment 500.

Computer system 700 may also comprise software elements, shown as being currently located within working memory 718, including an operating system 720 and/or other code 722, such as an application program (which may be a client application, Web browser, mid-tier application, RDBMS, etc.). It should be appreciated that alternative embodiments of computer system 700 may have numerous variations from that described above. For example, customized hardware might also be used and/or particular elements might be implemented in hardware, software (including portable software, such as applets), or both. Further, connection to other computing devices such as network input/output devices may be employed.

In one set of embodiments, the techniques described herein may be implemented as program code executable by a computer system (such as a computer system 700) and may be stored on machine-readable storage media. Machine-readable storage media may include any appropriate media known or used in the art, including storage media and communication media, such as (but not limited to) volatile and non-volatile, removable and non-removable media implemented in any method or technology for storage and/or transmission of information such as machine-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store or transmit the desired information and which can be accessed by a computer.

Although specific embodiments of the present invention have been described, various modifications, alterations, alternative constructions, and equivalents are within the scope of the invention. For example, embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. The scope of the invention should be determined not with reference to the above description, but instead should be determined with reference to the pending claims along with their full scope or equivalents.

What is claimed is:

1. A method of implementing a touch screen optimized pivot table, the method comprising:
   providing a view of a hierarchal table on a touch screen, wherein the hierarchal table includes a plurality of hierarchal levels in a hierarchal structure and each of the plurality of hierarchal levels included corresponding data, and further includes columns and rows;
   mapping each of the plurality of hierarchal levels to each of a plurality of corresponding regions, and wherein each region's view displays the corresponding data for the mapped hierarchal level, wherein the plurality of corresponding regions include at least two levels including one or more parent nodes and at least one child node, and wherein a region that is a subordinate region is smaller than or equal to at least one region and is configured to be able to contain one or more sub-regions;
   displaying on the touch screen the corresponding data from a subset of the plurality of regions which includes less than the entire plurality of hierarchal levels of the hierarchal structure;
   receiving at the touch screen input to scroll at least one of the plurality of regions on the touch screen, wherein as at least one of the plurality of regions is spun the corresponding data for each of the plurality of remaining regions are updated according to the hierarchical structure, and wherein each of the plurality of hierarchal levels are represented by a distinct region of the plurality of regions on the touch screen display, wherein if there is more data to be displayed or the touch screen cannot include all of the data, then display is spun to the subsequent region; and
   in response to the received input, causing each subordinate region to the at least one manipulated region to update the display of the corresponding data in each of the subordinate regions to allow independent scrolling of the columns and the rows within the hierarchal table, wherein each of the columns in one region are displayed and then all the columns and rows inside a region are scrolled together while all other regions remain the same, and the lowest level in the hierarchal structure is still able to be scrolled.

2. The method of implementing the touch screen optimized pivot table as in claim 1, further comprising in response to receiving the input to manipulate the at least one of the plurality of regions on the touch screen, causing the at least one of the plurality of regions to spin through the corresponding data in the direction of the manipulation.

3. The method of implementing the touch screen optimized pivot table as in claim 1, wherein each of the plurality of hierarchal levels has a one-to-one mapping to each of the plurality of corresponding regions on the touch screen.

4. The method of implementing the touch screen optimized pivot table as in claim 1, wherein the touch screen comprises a multi-touch screen.

5. The method of implementing the touch screen optimized pivot table as in claim 4, wherein more than one of the plurality of regions are configured to be manipulated simultaneously.

6. The method of implementing the touch screen optimized pivot table as in claim 1, further comprising orienting the plurality of regions to maximize font size of the corresponding data displayed for each region and maximize the number of levels of the hierarchy simultaneously displayed on the touch screen.

7. A non-transitory machine-readable storage medium having sets of instructions stored thereon which, when executed by a machine, cause the machine to:
   provide a view of a hierarchal table on a touch screen, wherein the hierarchal table includes a plurality of hierarchal levels in a hierarchal structure and each of the plurality of hierarchal levels included corresponding data, and further includes columns and rows;
   map each of the plurality of hierarchal levels to each of a plurality of corresponding regions, and wherein each region's view displays the corresponding data for the mapped hierarchal level, wherein the plurality of corresponding regions include at least two levels including one or more parent nodes and at least one child node, and wherein a region that is a subordinate region is smaller than or equal to at least one region and is configured to be able to contain one or more sub-regions;
   display on the touch screen the corresponding data from a subset of the plurality of regions which includes less than the entire plurality of hierarchal levels of the hierarchal structure;
   receive at the touch screen input to scroll at least one of the plurality of regions on the touch screen, wherein as at least one of the plurality of regions is spun the corresponding data for each of the plurality of remaining regions are updated according to the hierarchical structure, and wherein each of the plurality of hierarchal levels are represented by a distinct region of the plurality of regions on the touch screen display, wherein if there is more data to be displayed or the touch screen cannot include all of the data, then display is spun to the subsequent region; and in response to the received input, cause each subordinate region to the at least one manipulated region to update the display of the corresponding data in each of the subordinate regions to allow independent scrolling of the columns and the rows within the hierarchal table, wherein each of the columns in one region are displayed and then all the columns and rows inside a region are scrolled together while all other regions remain the same, and the lowest level in the hierarchal structure is still able to be scrolled.

8. The non-transitory machine-readable storage medium as in claim 7, wherein the sets of instruction when further executed by the machine, cause the machine to in response to receiving the input to manipulate the at least one of the plurality of regions on the touch screen, cause the at least one of the plurality of regions to spin through the corresponding data in the direction of the manipulation.

9. The non-transitory machine-readable storage medium as in claim 7, wherein each of the plurality of hierarchal levels has a one-to-one mapping to each of the plurality of corresponding regions on the touch screen.

10. The non-transitory machine-readable storage medium as in claim 7, wherein the touch screen comprises a multi-touch screen.

11. The non-transitory machine-readable storage medium as in claim 10, wherein more than one of the plurality of regions are configured to be manipulated simultaneously.

12. The non-transitory machine-readable storage medium as in claim 7, wherein the sets of instruction when further executed by the machine, cause the machine to orient the plurality of regions to maximize space for the corresponding data to be displayed for each region and maximize the number of levels of the hierarchy simultaneously displayed on the touch screen.

13. A device comprising:
a multi-touch screen;
a memory; and
a processor coupled with the memory and the multi-touch screen, wherein the memory includes sets of instructions stored thereon which, when executed by the processor, cause the processor to:
provide a view of a hierarchal table on a touch screen, wherein the hierarchal table includes a plurality of hierarchal levels in a hierarchal structure and each of the plurality of hierarchal levels included corresponding data, and further includes columns and rows;
map each of the plurality of hierarchal levels to each of a plurality of corresponding regions, and wherein each region's view displays the corresponding data for the mapped hierarchal level, wherein the plurality of corresponding regions include at least two levels including one or more parent nodes and at least one child node, and wherein a region that is a subordinate region is smaller than or equal to at least one region and is configured to be able to contain one or more sub-regions;
display on the touch screen the corresponding data from a subset of the plurality of regions which includes less than the entire plurality of hierarchal levels of the hierarchal structure;
receive at the touch screen input to scroll at least one of the plurality of regions on the touch screen, wherein as at least one of the plurality of regions is spun the corresponding data for each of the plurality of remaining regions are updated according to the hierarchical structure, and wherein each of the plurality of hierarchal levels are represented by a distinct region of the plurality of regions on the touch screen display, wherein if there is more data to be displayed or the touch screen cannot include all of the data, then display is spun to the subsequent region; and
in response to the received input, cause each subordinate region to the at least one manipulated region to update the display of the corresponding data in each of the subordinate regions to allow independent scrolling of the columns and the rows within the hierarchal table, wherein each of the columns in one region are displayed and then all the columns and rows inside a region are scrolled together while all other regions remain the same, and the lowest level in the hierarchal structure is still able to be scrolled.

14. The device as in claim 13, wherein the sets of instruction when further executed by the processor, cause the processor to in response to receiving the input to manipulate the at least one of the plurality of regions on the touch screen, cause the at least one of the plurality of regions to spin through the corresponding data in the direction of the manipulation.

15. The device as in claim 13, wherein each of the plurality of hierarchal levels has a one-to-one mapping to each of the plurality of corresponding regions on the touch screen.

16. The device as in claim 13, wherein more than one of the plurality of regions are configured to be manipulated simultaneously.

17. The device as in claim 13, wherein the sets of instruction when further executed by the processor, cause the processor to orient the plurality of regions to maximize font size of the corresponding data displayed for each region and maximize the number of levels of the hierarchy simultaneously displayed on the touch screen.

* * * * *

UNITED STATES PATENT AND TRADEMARK OFFICE
CERTIFICATE OF CORRECTION

| | | |
|---|---|---|
| PATENT NO. | : 8,719,725 B2 | Page 1 of 1 |
| APPLICATION NO. | : 13/185286 | |
| DATED | : May 6, 2014 | |
| INVENTOR(S) | : Workman et al. | |

It is certified that error appears in the above-identified patent and that said Letters Patent is hereby corrected as shown below:

In the Drawings

On sheet 7 of 10, in figure 4B, under reference numeral 465, line 2, delete "our" and insert -- out --, therefor.

Signed and Sealed this
Fourteenth Day of October, 2014

Michelle K. Lee
*Deputy Director of the United States Patent and Trademark Office*